Jan. 4, 1949.  A. G. CARBUHN  2,458,342
CONTROL LEVER BOOSTER

Filed June 21, 1947  2 Sheets-Sheet 1

INVENTOR.
Harold G. Carbuhn
BY
ATTORNEY

Jan. 4, 1949. A. G. CARBUHN 2,458,342
CONTROL LEVER BOOSTER

Filed June 21, 1947 2 Sheets-Sheet 2

INVENTOR.
Harold G. Carbuhn
BY
Glenn L. Fish
ATTORNEY

Patented Jan. 4, 1949

2,458,342

UNITED STATES PATENT OFFICE 2,458,342

CONTROL LEVER BOOSTER

Harold G. Carbuhn, Spokane, Wash.

Application June 21, 1947, Serial No. 756,117

1 Claim. (Cl. 74—97)

My present invention relates to an improved control lever booster of the type especially adapted for use with a clutch steering lever and mechanism commonly used on endless track tractors wherein the steering is accomplished by de-clutching and braking one track while the other continues.

Customarily the operation of the clutch bar requires considerable manual effort and it is the purpose of my invention to use spring means to provide the larger part of the power required to accomplish the movement.

In the accompanying drawings I have illustrated one complete example of the physical embodiment of my invention according to the best mode I have thus far devised, but it will be understood that various changes and alterations may be made in the exemplified structure within the scope of the appended claims.

Figure 1:
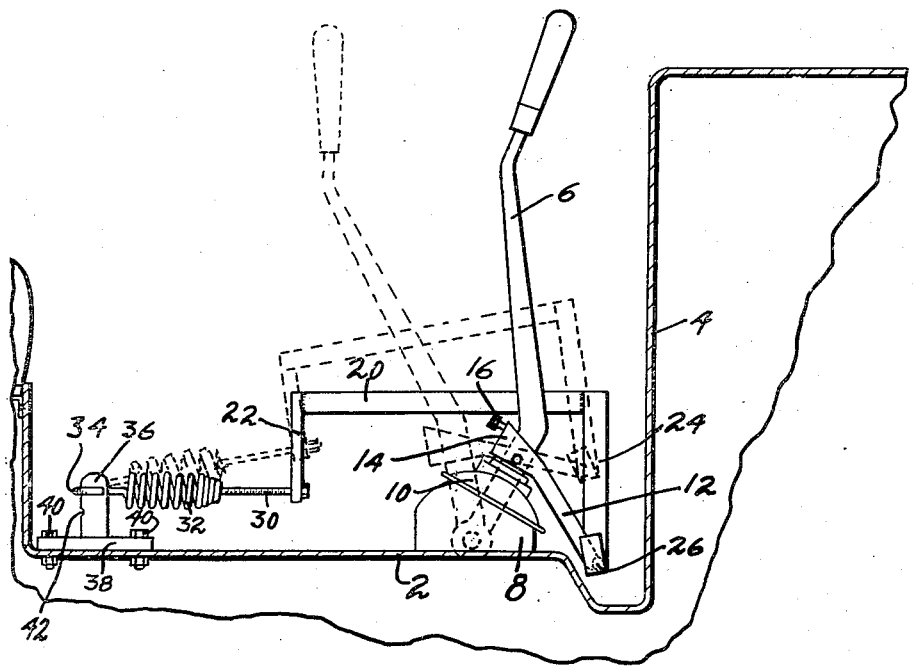
Fig. 1 is an elevational view of the booster in operated position.
Figure 2:
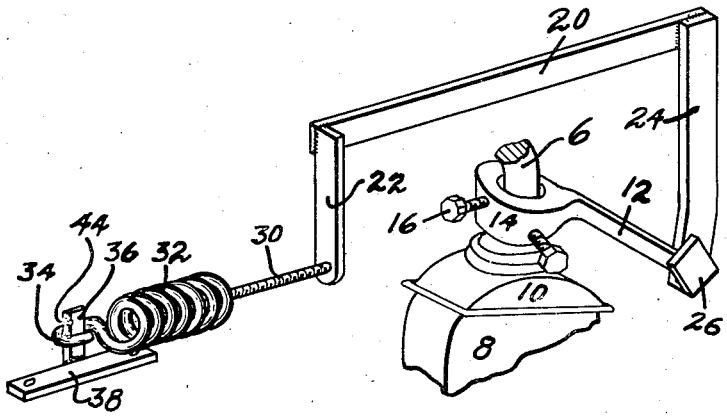
Fig. 2 is a perspective view of the booster.
Figure 3:
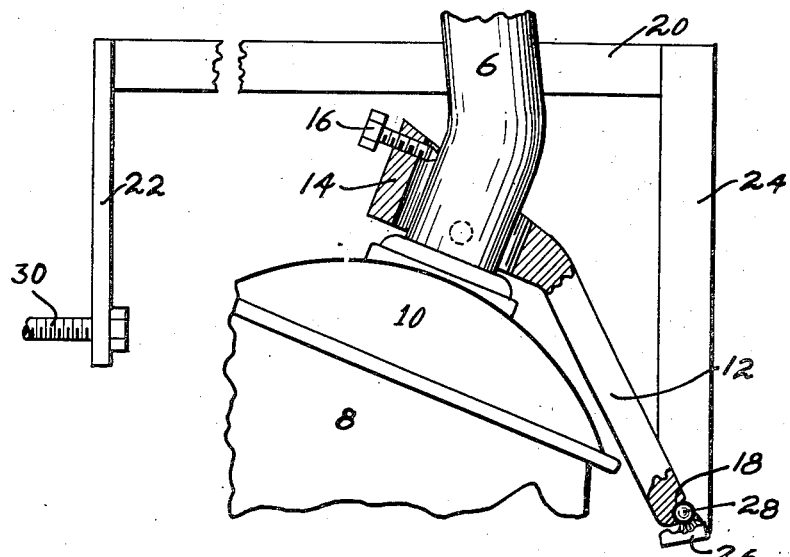
Fig. 3 is an enlarged elevational view thereof.
Figure 4:
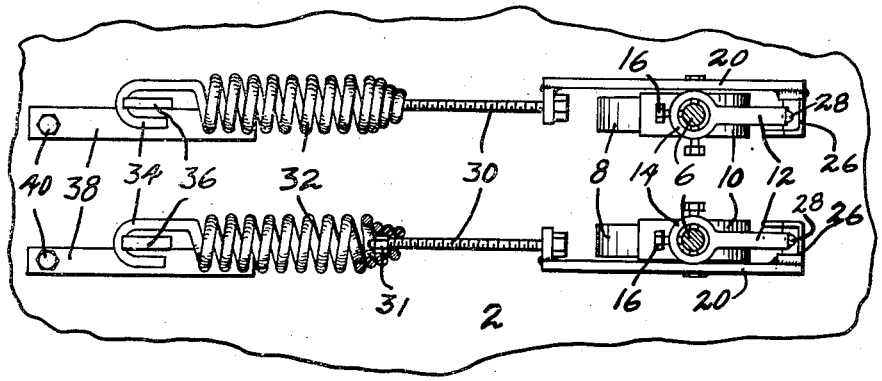
Fig. 4 is a top plan view of a pair of assemblies for the usual two clutch levers.

Referring now to the drawings wherein I have illustrated the present preferred embodiment of my invention I have shown a structural part of a tractor including a floor 2 and a riser 4. A clutch lever 6 is mounted in the housing 8 with the usual cap 10 and the clutch lever is moved forwardly to engaging position and rearwardly to disengaging position.

To ease the forward and backward movement of the lever I employ an arm 12 having a collar 14 secured to the lever by set screws 16 and the arm declines angularly from the collar and the free end is recessed or grooved at 18.

A U-frame 20 formed with a short leg 22 and longer leg 24 passes to one side of the lever, and the long leg is bent upon itself at 26 and has in the yoke thus formed a ball bearing 28 welded or otherwise affixed in the yoke.

A bolt 30 passes through the end portion of the short leg at right angles thereto and on a line which would pass through the approximate transverse medial line of the longer leg. This bolt 30 is secured to a spring 32 having a hook end 34 about a stud 36 formed with a flange plate 38 attached to the floor 2 by bolts 40. Notches 42 and 44 in the stud permit adjustment of the spring hook, with respect to the pivot point of the clutch lever 6.

With the arm 12 in either up or down position respectively above or below the pivot point of the clutch lever it will be apparent that the spring and the U-frame will urge the arm into either position beyond center and therefore the operator need only move the lever past dead center whereupon the spring will assist in pulling the lever to position.

The tension may be varied by threading the bolt 30 into the nut 31 secured to the spring 32.

Having thus fully described my invention what I claim as new and desire to secure by Letters Patent is:

A power booster for a control lever having a pivot point and comprising a U-frame having a short leg and a long leg bent to form a yoke and a ball bearing in the yoke, an angular arm secured to the lever and rearwardly, spherically recessed to receive the bearing of the long leg, and spring means tensioning the short leg so that the bearing of the arm and the long leg will be above the pivot point or below the pivot point to urge the lever to the manually initiated position.

HAROLD G. CARBUHN.

REFERENCES CITED

The following references are of record in the file of this patent:

UNITED STATES PATENTS

| Number | Name | Date |
|---|---|---|
| 525,724 | Scott | Sept. 11, 1894 |
| 1,804,903 | Wemp | May 12, 1931 |
| 2,027,659 | Weisbrod | Jan. 14, 1936 |

FOREIGN PATENTS

| Number | Country | Date |
|---|---|---|
| 478,968 | Great Britain | Jan. 27, 1938 |